(12) United States Patent  
Plotnikov et al.

(10) Patent No.: US 8,989,058 B2  
(45) Date of Patent: Mar. 24, 2015

(54) CONFERENCE MIXING USING TURBO-VAD

(71) Applicant: Marvell World Trade Ltd., St. Michael (BB)

(72) Inventors: Anatoli Plotnikov, Beer-Sheva (IL); Timor Kardashov, Kiriyat Ono (IL); Maxim Kovalenko, Rehovot (IL)

(73) Assignee: Marvell World Trade Ltd., St. Michael (BB)

( * ) Notice: Subject to any disclaimer, the term of this patent is extended or adjusted under 35 U.S.C. 154(b) by 359 days.

(21) Appl. No.: 13/629,176

(22) Filed: Sep. 27, 2012

(65) Prior Publication Data

US 2013/0077538 A1 Mar. 28, 2013

Related U.S. Application Data

(60) Provisional application No. 61/540,123, filed on Sep. 28, 2011, provisional application No. 61/607,356, filed on Mar. 6, 2012.

(51) Int. Cl.
*H04L 12/16* (2006.01)
*H04Q 11/00* (2006.01)
*H04L 12/18* (2006.01)

(52) U.S. Cl.
CPC ........ *H04L 12/1827* (2013.01); *H04L 12/1822* (2013.01)
USPC .......................................................... 370/260

(58) Field of Classification Search
None
See application file for complete search history.

(56) References Cited

U.S. PATENT DOCUMENTS

| | | | | |
|---|---|---|---|---|
| 6,956,828 | B2 * | 10/2005 | Simard et al. ................. | 370/260 |
| 7,292,543 | B2 * | 11/2007 | Li ................................ | 370/260 |
| 7,983,200 | B2 * | 7/2011 | Simard et al. ................. | 370/260 |
| 2011/0208520 | A1 * | 8/2011 | Lee .............................. | 704/233 |

* cited by examiner

*Primary Examiner* — Ashley Shivers

(57) ABSTRACT

A conference mixer includes a unit configured to receive a plurality of input streams, a spectral voice activity detection (VAD) unit configured to, for each of the input streams, generate and output a spectral VAD decision indicating whether a frame including data packets is voice, a turbo VAD unit configured to generate and output a turbo VAD decision that indicates for a frame including data packets which input stream is active, the turbo VAD decision being based on the spectral VAD decisions and a power-based decision indicating whether an estimated instantaneous power level of a frame including data packets is greater than a power threshold, and a finite state machine (FSM) unit configured to select which of the input streams to output as an active stream based on a plurality of the turbo VAD decisions, the turbo VAD decision being based in part on feedback provided by the FSM.

20 Claims, 6 Drawing Sheets

CONFERENCE MIXING USING TURBO-VAD

CROSS-REFERENCE TO RELATED APPLICATION

The present application claims priority from U.S. Provisional Patent Application Nos. 61/540,123, filed Sep. 28, 2011 and 61/607,356, filed Mar. 6, 2012, the disclosures of which are incorporated herein in its entirety by reference.

BACKGROUND

1. Field

The current disclosure relates to voice communications, and more particularly, to conference mixing techniques.

2. Background

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Conference call technology enables multiple participants, or conferees, to communicate with each other over a network. Various currently used conference call technologies employ Voice Over Internet Protocol (VoIP), which uses the Internet Protocol (IP) to enable communications over a network, such as the Internet. Conference call equipment typically uses conference mixers which are configured to receive and process audio signals from each of the conferees, and to output appropriate signals to each of the conferees based on conference mixing algorithms.

The design of conference mixers faces various challenges, including: the avoidance of treating background noise as a voice signal, which degrades conference quality, managing multi-talk periods when several conferees are talking simultaneously, maintaining a natural flow in a conference despite interruptions by previously inactive conferees, and maintaining smooth transitions among conferees that avoid clipping off of a conversation as it passes from one conferee to another.

SUMMARY

One or more embodiments of the disclosure relate to an improved method and apparatus for conference mixing.

The conference mixer according to an embodiment uses a mixing algorithm based on a variation of a Time-Level criterion. In an embodiment, standard VoIP modules as well as some dedicated modules can be used. The mixing algorithm according to an embodiment may achieve one or more several advantageous benefits not achieved by conventional conference mixers, including, for example, an ability to support high quality conference calls in various noise conditions, low processing delays, a simple implementation, and reasonable demands for computational resources. The mixing algorithm according to embodiments can use simple building blocks to guarantee simplicity and minimal processing delays. According to embodiments, closed loop feedback laid in the foundations of the mixing algorithm provides noise rejection and ensures high quality.

It is understood, of course, that the mixing algorithm according to some embodiments is not required to achieve these benefits.

According to an embodiment, there is provided a conference mixer including an input stream receiving unit configured to receive a plurality of input streams of data packets from a corresponding plurality of conferees connected to the conference mixer; a spectral voice activity detection (VAD) unit configured to, for each of the input streams, generate and output a spectral VAD decision indicating whether a frame including data packets is voice; a turbo VAD unit configured to generate and output a turbo VAD decision that indicates for a frame including data which of the input streams is active, the turbo VAD decision being based on the spectral VAD decisions for each of the input streams and a power-based decision indicating whether an estimated instantaneous power level of a frame including data packets is greater than a power threshold for each of the input streams; and a finite state machine (FSM) unit configured to select which of the input streams to output as an active stream based on a plurality of the turbo VAD decisions corresponding to a plurality of frames in the input streams.

According to an embodiment, the turbo VAD unit includes a power estimating unit configured to estimate, for each of the input streams, the instantaneous power level of a frame; a comparing unit configured to compare, for each of the input streams, the estimated instantaneous power level of the frame with the power threshold, the power threshold indicating a minimum power level of voice data, and to output the power-based decision based on a result of the comparison; the spectral VAD unit configured to output, for each of the input streams, the spectral VAD decision; and a multiplier configured to multiply, for each of the input streams, the power-based decision and the spectral VAD decision to generate the turbo VAD decision.

According to an embodiment, the spectral VAD unit is disposed within the turbo VAD unit.

According to an embodiment, the spectral VAD unit includes a VAD unit implemented in accordance with ITU-T G.729 annex B recommendation.

According to an embodiment, the conference mixer further includes a voice monitoring unit configured to, for each of the input streams, estimate an average voice power level and an average noise power level of the input stream and to generate the power threshold based on a weighted average of the estimated average voice power level and the estimated average noise power level.

According to an embodiment, the FSM unit is configured to generate, for each of the input streams, an activity ratio indicative of a likelihood that the input stream is voice data based on the turbo VAD decision.

According to an embodiment, the FSM unit generates the activity ratio such that the generated activity ratio comprises a numerical value between 0 and 1, wherein the value "0" indicates a complete absence of voice data in the input stream, and wherein the value approaches the value "1" as an amount of the voice data in the input stream increases.

According to an embodiment, the FSM unit is further configured to generate, for each of the input streams, state information indicating a current state of the input stream, the current state indicative of whether the input stream is currently carrying voice data, and feedback the state information to the voice monitoring unit, and the voice monitoring unit is further configured to estimate the average voice power level and the average noise power level of the input stream based at least in part on the state information fedback from the FSM unit.

According to an embodiment, the FSM unit generates the state information to indicate one of the following current states of the input stream: (a) an active state indicating that the input stream is currently carrying voice data, (b) a not active state indicating that the input stream is currently not carrying any voice data, (c) a fade-in state indicating that the input stream is transitioning from the not active state to the active state, and (d) a fade-out state indicating that the input stream is transitioning from the active state to the not active state.

According to an embodiment, the conference mixer further includes a gain control unit configured to, for each of the input streams, adjust a gain based on the estimated average voice power level of the input stream and the estimated average noise power level of the input stream.

According to an embodiment, the conference mixer further includes a noise suppressor configured to, for each of the input streams, suppress noise based on the estimated average voice power level of the input stream and the estimated average noise power level of the input stream.

According to an embodiment, a method of conference mixing includes receiving a plurality of input streams of data packets from a corresponding plurality of conferees; generating and outputting a spectral VAD decision indicating whether a frame including data packets is voice for each of the input streams; generating and outputting a turbo VAD decision that indicates for a frame including data packets which of the input streams is active, the generating and outputting of the turbo VAD decision being based on the spectral VAD decisions for each of the input streams and a power-based decision indicating whether an estimated instantaneous power level of a frame is greater than a power threshold for each of the input streams; and selecting which of the input streams to output as an active stream based on a plurality of the turbo VAD decisions corresponding to a plurality of frames in the input streams.

According to an embodiment, the method further includes estimating, for each of the input streams, the instantaneous power level of a frame; comparing, for each of the input streams, the estimated instantaneous power level of the frame with the power threshold, the power threshold indicating a minimum power level of voice data, and outputting the power-based decision based on a result of the comparing; outputting, for each of the input streams, the spectral VAD decision; and multiplying, for each of the input streams, the power-based decision and the spectral VAD decision to generate the turbo VAD decision.

According to an embodiment, the generating and outputting of the spectral VAD decision includes generating and outputting the spectral VAD decision using a spectral VAD unit disposed within a turbo VAD unit used to generate the turbo VAD decision.

According to an embodiment, the generating and outputting of the spectral VAD decision includes using a VAD unit implemented in accordance with ITU-T G.729 annex B recommendation to generate and output the spectral VAD decision.

According to an embodiment, the method further includes, for each of the input streams, estimating an average voice power level and an average noise power level of the input stream and generating the power threshold based on a weighted average of the estimated average voice power level and the estimated average noise power level.

According to an embodiment, the method further includes, for each of the input streams, generating an activity ratio indicative of a likelihood that the input stream is voice data based on the turbo VAD decision.

According to an embodiment, the generating of the activity ratio includes generating the activity ratio such that the generated activity ratio comprises a numerical value between 0 and 1, wherein the value "0" indicates a complete absence of voice data in the input stream, and wherein the value approaches the value "1" as an amount of the voice data in the input stream increases.

According to an embodiment, the method further includes generating, for each of the input streams, state information indicating a current state of the input stream, the current state indicative of whether the input stream is currently carrying voice data, and feeding back the state information, and estimating the average voice power level and the average noise power level of the input stream based on the state information fedback.

According to an embodiment, the generating of the state information includes generating the state information to indicate one of the following current states of the input stream: (a) an active state indicating that the input stream is currently carrying voice data, (b) a not active state indicating that the input stream is currently not carrying any voice data, (c) a fade-in state indicating that the input stream is transitioning from the not active state to the active state, and (d) a fade-out state indicating that the input stream is transitioning from the active state to the not active state.

DRAWINGS

DETAILED DESCRIPTION

Embodiments will be described below in more detail with reference to the accompanying drawings. The following detailed descriptions are provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The terms used in the description are intended to describe embodiments only, and shall by no means be restrictive. Unless clearly used otherwise, expressions in a singular form include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Figure 1:
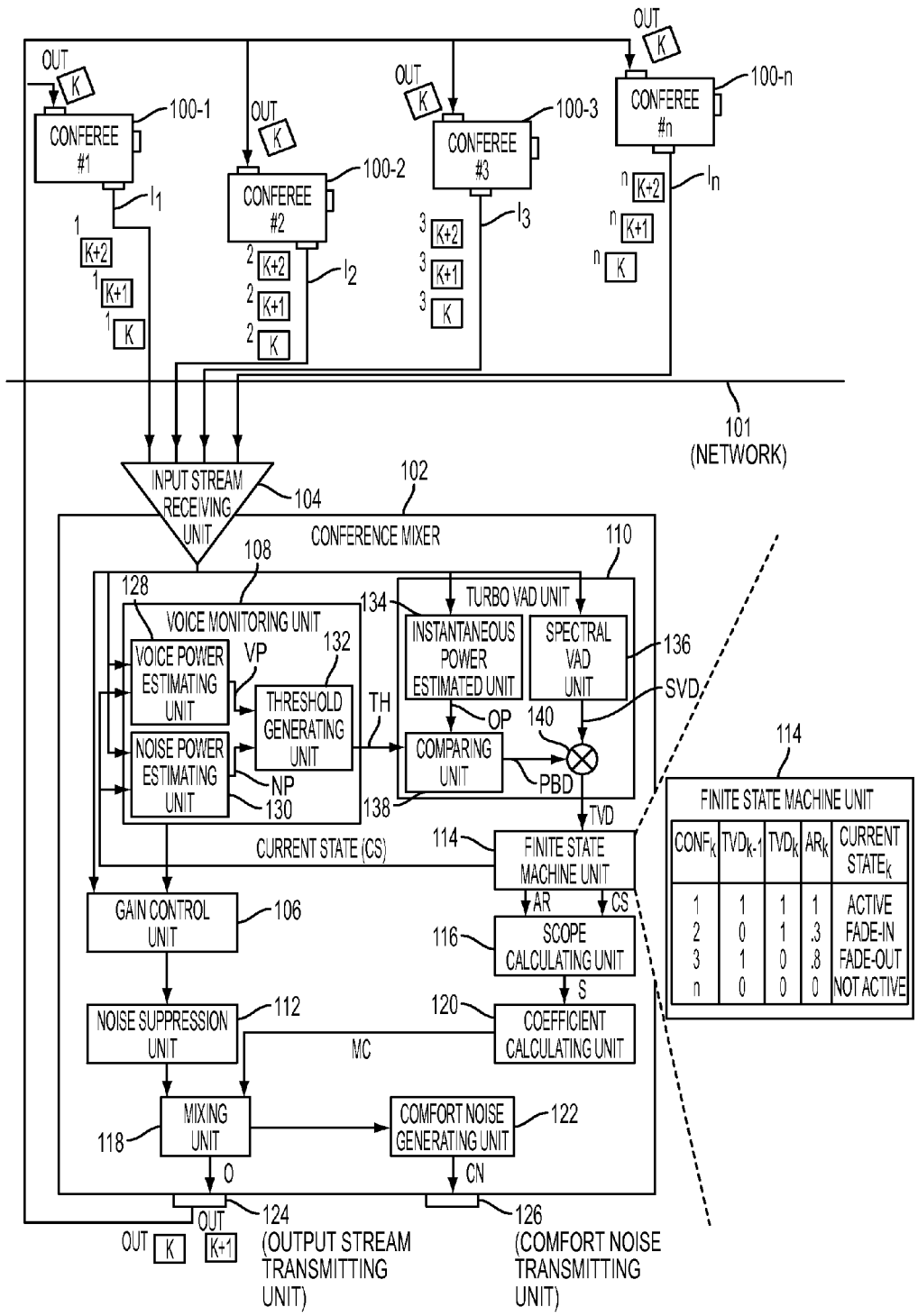
FIG. 1 is a block diagram illustrating a conference mixer according to an embodiment.

FIG. 1 is a block diagram illustrating a conference mixer 102 according to an embodiment. As shown in FIG. 1, the conference mixer 102 is connected over a network 101 to a plurality of conferees, including conferee 100-1, conferee 100-2, conferee 100-3, and through conferee 100-n. The location of the mixer 102 relative to the conferees 100 is flexible. For example, the conference mixer 102 is associated with a network gateway or other network switch device associated with a conferee. In an example, equipment of one of the conferees 200 is coupled to the gateway/network device, and other conferees are coupled over the Internet. Alternatively, the conference mixer 102 is centrally located with all of the conferees coupled to the conference mixer 102 over an Internet connection.

The network 101 is a communication network or combination of various communication networks. For example, in an embodiment, the network 101 is a packet-switched network, such as the global, IP-based Internet, and the network 101 may further encompass various entities used to access the Internet, such as, for example, Internet service providers (ISPs). A detailed description of various entities involved in connecting to the Internet is omitted to avoid obfuscating teachings of the present disclosure.

Conferee 100-1 uses a conference call communications device, such as a personal computer, a telephone, or another type of electronic device capable of communicating with the other conferees 100-2 through 100-n. The conference call communications device of conferee 100-1 typically includes several components used to participate in a conference call, such as a microphone to input the voice data of conferee 100-1 to the other conferees 100-2 through 100-n via the conference mixer 102, and a speaker to output voice data transmitted from one or more of the other conferees 100-2 through 100-n via the conference mixer 102. The conference call communications device of the conferees 100 may vary. For example, if the conference mixer 102 is associated with a network gateway or other network switch device and one of the conferees 200 is coupled to the gateway/network device, the conferee will have additional connection devices connecting the conferee to the conference mixer 102.

As shown in FIG. 1, when conferee 100-1 desires to participate in the conference call, conferee 100-1 speaks into his or her conference call communications device and thereby transmits an input stream $I_1$ of voice data over the network 101 to the conference mixer 102. The input stream $I_1$ of conferee 100-1 includes data packets corresponding to the voice data of conferee 100-1. The data packets are arranged in frames k, k+1, k+2, which are digital data transmission units. FIG. 1 illustrates conferees 100-1, 100-2, 100-3 and 100-n respectively inputting input streams $I_1$, $I_2$, $I_3$, and $I_4$ to the conference mixer 102. Some of these input streams may be comprised of actual voice data communicated by the conferees, and other of these input streams may be comprised of non-voice data, such as, for example, background noise generated by the conferee's environment.

In contrast to conventional conference mixers, which have difficulty distinguishing unwanted non-voice data (e.g., background noise) from voice data, the conference mixer 102 is configured to effectively filter out unwanted non-voice data from a conference. Additionally, the conference mixer 102 achieves various improvements over conventional conference mixers, including adequately manages multi-talk periods when several conferees are talking simultaneously, acknowledges an inactive conferee's interruption into discussion to retain the natural flow of the conference, and maintains smooth transitions between conferees. To achieve these and/or other benefits over the conventional conference mixers, the conference mixer 102 according to an embodiment utilizes a novel component, referred to as the Turbo Voice Activity Detection (VAD) unit 110, also referred to as a Turbo-VAD unit, which generates a Turbo-VAD decision that is used to enable fast threshold adjustment and to maintain high quality conference calls in noisy conditions.

It is noted that conventional VAD techniques inherently are biased towards voice decisions, in other words, biased towards deciding a sound is voice even if the sound is not actual voice data of a conferee. This is because a primary functionality of conventional VAD techniques is to reduce Band Width in point to point VoIP calls without introducing voice degradation. In conference calls, however, this bias is undesirable since undetected noise from one conferee may be mixed together with voice from another conferee or, even worse, mask it altogether. As such, conventional VAD techniques are typically not deemed suitable for conference call mixing. The Turbo VAD unit 110, employing a modified VAD technique which is suitable for conference call mixing, will be described in detail below.

In order to keep the mixing algorithm used by the conference mixer flexible, only a few external inputs are defined for the algorithm. The main inputs, in accordance with an embodiment, are shown in FIG. 1, and are described below. Implementation of the units which are described below may change, while retaining the same interface.

The conference mixer 102 includes, in an embodiment, an input stream receiving unit 104, a gain control unit 106, a voice monitoring unit 108, a turbo VAD unit 110, a noise suppression unit 112, a finite state machine (FSM) unit 114, a score calculating unit 116, a mixing unit 118, a coefficient calculating unit 120, a comfort noise generating unit 122, an output stream transmitting unit 124, and a comfort noise transmitting unit 126. These components are coupled together as seen in FIG. 1.

The input stream receiving unit 104 is a component configured to receive the input streams $I_1$, $I_2$, $I_3$, and $I_4$ transmitted from the conferees 100-1, 100-2, 100-3 and 100-n, respectively. In an embodiment, the input stream receiving unit 104 is a component which is configured to receive digital signals, and functions as an interface between the conference mixer 102 and the conferees 100-1, 100-2, 100-3 and 100-n. In an embodiment, the input stream receiving unit 104 is a logical block implemented in software. The input streams may originate at the network, a VoIP phone, etc. In an embodiment, the input stream receiving unit 104 receives a plurality of input streams of data packets from a corresponding plurality of conferees connected to the conference mixer 102.

The voice monitoring unit 108 includes a voice power estimating unit 128, a noise power estimating unit 130, and a threshold generating unit 132.

The voice power estimating unit 128 and noise power estimating unit 130 continuously measure average voice and noise power of an input stream according to a state of FSM 114, in an embodiment. These measurements are used by the Turbo VAD unit 110 and for the activation of the gain control unit 106 and the noise suppression unit 112 (if enabled). More specifically, as shown in FIG. 1, the voice power estimating unit 128 and the noise power estimating unit 130 are connected to the input stream receiving unit 104 to receive input stream information. Furthermore, the voice power estimating unit 128 and the noise power estimating unit 130 are also connected to the finite state machine unit 114 to receive state information and to calculate the average voice and noise power of the input stream based on the received state information.

The voice power estimating unit 128 and noise power estimating unit 130 are activated according to a system state and use autoregressive calculation, in an embodiment. The voice power estimating unit 128 has a leakage property configured to avoid deadlocks (which may result for example from very intensive noise that is erroneously classified as voice by the spectral VAD unit 136). The estimation scheme is given below by Equation 1 (where k denotes a frame index, and $P_k$ denotes frame k power):

$$\text{Voice\_Est}_k = \qquad\qquad\qquad\qquad \text{Equation 1}$$

$$\begin{cases} (1-\zeta_{voice}) * \text{Voice\_Est}_{k-1} + \\ \quad \zeta_{voice} * P_k, & \text{state = ACTIVE} \\ (1-\zeta_{leakage}) * \text{Voice\_Est}_{k-1}, & \text{state = NOT ACTIVE} \\ \quad \text{Voice\_Est}_{k-1}, & \text{else} \end{cases}$$

$$\text{Noise\_Est}_k =$$

$$\begin{cases} (1-\zeta_{noise}) * \text{Noise\_Est}_{k-1} + \\ \quad \zeta_{noise} * P_k, & \text{state = NOT ACTIVE} \\ \quad \text{Noise\_Est}_{k-1}, & \text{else} \end{cases}$$

As shown in Equation 1, the average voice power estimate for a given frame k is calculated using one of three formulas, depending on whether the state information transmitted from the FSM unit 114 indicates an "ACTIVE" state, a "NOT ACTIVE" state, or another state such as a transition state from ACTIVE to NOT ACTIVE, or vice versa. Also, the average noise power estimate for a given frame k is calculated using one of two formulas, depending on whether the state information transmitted from the FSM unit 114 indicates a "NOT ACTIVE" or another state such as a transition state.

The average noise and voice power estimates are initialized, in an embodiment, with −40 dBm value. This value is relatively low, hence in case the spectral VAD unit 136 incorrectly indicates voice, the system will adapt only when actual voice is input.

The coefficients should satisfy the following relations: $\zeta_{leakage} \ll \zeta_{voice} \approx \zeta_{noise} \ll \zeta_{power2} < \zeta_{power1}$. The reason is that voice and noise estimations represent long term levels (1-10 seconds) which are used for threshold and gain control. Power estimation, on the other hand, is used for activity decision per frame and hence represents an instantaneous power level (50-100 ms).

The threshold generating unit 132 generates a power threshold based on the average voice and noise power estimations calculated by the voice power estimating unit 128 and noise power estimating unit 130, respectively, and transmits the generated power threshold to the comparing unit 138 in the Turbo VAD unit 110. In an embodiment, the power threshold is calculated as a weighted average of the noise and voice power levels (in dBm units) with some modifications—the threshold is kept between −40 to −20 dBm and not below the value of (Voice_Est$_k$−10 dB). Alternatively the power threshold is calculated in any other suitable manner. The power threshold is used by the Turbo VAD unit 110 as an indicator of a minimum power level of voice data, as will be explained later.

The Turbo VAD unit 110 generates a Turbo VAD decision, in an embodiment, using a closed loop feedback scheme to enable fast threshold adjustment and to guarantee high quality conference calls in noisy conditions. The Turbo VAD decision indicates, on a frame-by-frame basis, whether a given frame is "active" (also referred to as "voiced"), in other words, whether the frame is voice data, or "inactive" (also referred to as "unvoiced"), in other words, whether the frame is non-voice data.

The Turbo VAD unit 110 includes an instantaneous power estimating unit 134, a spectral VAD unit 136, a comparing unit 138, and a multiplier 140.

The instantaneous power estimating unit 134 estimates the average power of an input stream on an instantaneous, i.e. frame-by-frame, basis in an embodiment. The instantaneous power of a given frame includes the power from both voice-data and non-voice data (e.g., background noise) of the given frame, in other words, the overall power. In an embodiment, the instantaneous power estimating unit 134 estimates the average instantaneous power according to the following Equation 2: (k denotes frame index, P$_k$ denotes frame k power and Power_Est$_k$ denotes average power estimation on step k):

if (P$_k$ > Power_Est$_{k-1}$)      Equation 2

Power_Est$_k$ = (1−$\zeta_{power1}$)*Power_Est$_{k-1}$ + $\zeta_{power1}$ * P$_k$ else Power_Est$_k$ = (1−$\zeta_{power2}$)*Power_Est$_{k-1}$ + $\zeta_{power2}$ * P$_k$ Where $\zeta_{power1} > \zeta_{power2}$.

Equation 2 is used in order to provide fast reaction on silence to talk transitions.

The instantaneous power estimating unit 134 then transmits the estimated instantaneous power level of the given frame to the comparing unit 138.

The comparing unit 138 compares the estimated instantaneous power level of the given frame transmitted from the instantaneous power estimating unit 134 to the power threshold transmitted from the threshold generating unit 132 and generates a power-based decision indicative of whether the estimated instantaneous power level of the given frame is greater than the power threshold based on the comparison. The power-based decision is positive (a value of 1) if and only if the estimated instantaneous power level is greater than the value of the power threshold. Otherwise, the power-based decision is negative (a value of 0). The comparing unit 138 then outputs the generated power-based decision to the multiplier 140. One or several of the components which operate to generate the power-based decision can be considered to be a "power-based VAD unit." For example, the comparing unit 138, instantaneous power estimating unit 134, and threshold generating unit 132 can be considered to be a "power-based VAD unit."

The spectral VAD unit 136 receives the input stream from the input stream receiving unit 104 and generates a spectral VAD decision based on the received input stream. The spectral VAD unit 136 generates the spectral VAD decisions on a frame-by-frame basis. In an embodiment, the spectral VAD unit 136 is a sub-block implemented in accordance with ITU-T G.729 annex B recommendation, although the spectral VAD unit 136 may also be implemented in other suitable ways. The spectral VAD unit 136 outputs a positive spectral VAD decision (a value of 1) if the spectral VAD unit 136 determines that the input stream is voice. Otherwise, the spectral VAD unit 136 outputs a negative spectral VAD decision (a value of 0). The spectral VAD unit 136 transmits the generated spectral VAD decision to the multiplier 140. In an embodiment, the spectral voice activity detection (VAD) unit generates and outputs a spectral VAD decision for each of a plurality of input streams indicating whether a frame of data packets of a conferee is voice.

The multiplier 140 performs a logical multiplication operation on the power-based decision output from the comparing unit 138 and the spectral VAD decision output from the spectral VAD unit 136 to generate a turbo-VAD decision for a given frame. If both the power-based decision and the spectral VAD decision are positive (values of 1), the multiplier 140 outputs a positive turbo VAD decision (value of 1) for the given frame. Otherwise, the multiplier 140 outputs a negative turbo-VAD decision (value of 0) for the given frame. Thus, the turbo-VAD decision is the logical product of the spectral VAD decision and the power-based decision, in an embodiment. The turbo-VAD decision for a given frame is then transmitted to the FSM unit 114.

Figure 2:
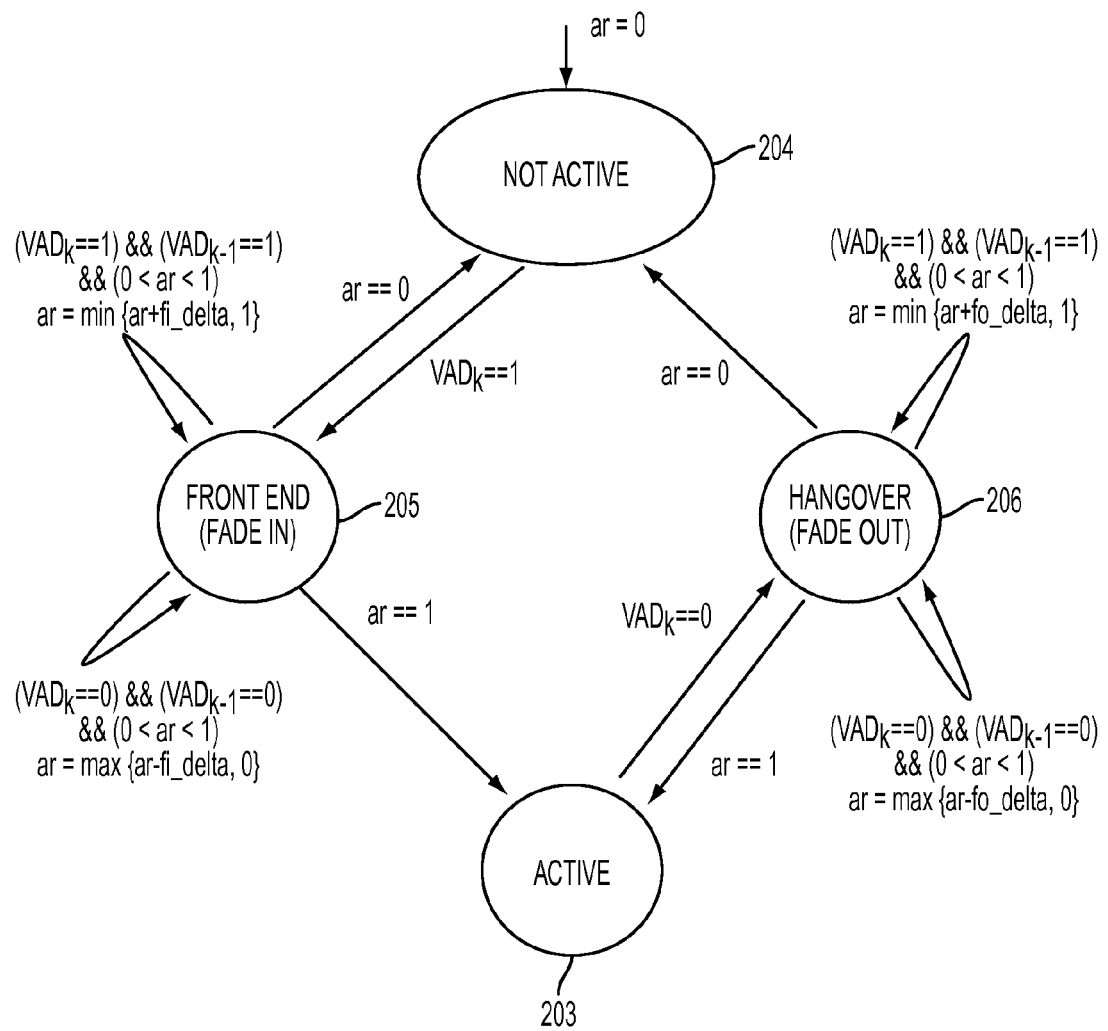
FIG. 2 is a state diagram illustrating an algorithm used by a Finite State Machine (FSM) unit according to an embodiment.

FIG. 2 is a state diagram illustrating an algorithm used by the FSM unit 114 to select whether to output a stream of frames as voice, according to an embodiment. The current state (active 203, not active 204, fade in 205, or fade out 206) is indicative of whether the input stream is currently carrying voice data and whether the input stream is in a transition period. As shown in FIG. 2, the algorithm used by the FSM unit 114 calculates an "activity ratio", represented by the variable "ar," which has a value between 0 and 1, for the input stream of each conferee. The activity ratio may be thought of as a softened VAD decision. Additional softening is performed when the activity ratio is translated into score, which will be described later. In an embodiment, the FSM unit 114 selects which of the input streams to output as an active stream based on a plurality of the turbo VAD decisions corresponding to a plurality of frames in the respective input streams.

A transition decision is made on every frame. Index k denotes the current frame. $VAD_k$ denotes the turbo-VAD decision for frame k of an input stream of one of the conferees. The variable "ar" denotes the conferee's calculated activity ratio. The variable "fi_delta" denotes the fade-in delta, which is used to determine the change in activity ratio while in a Front End (fade in) state, i.e., when a conferee is transitioning from an inactive state to an active state during the discussion. The variable "fo_delta" denotes the fade-out delta, which is used to determine the change in activity ratio while in the Hangover (fade out) state, i.e., when a conferee is transitioning from an active state to an inactive state. In an embodiment, a complete transition between Not Active and Active states during VAD=1 takes about 60 ms (6 frames), and the reverse transition between Active and Not Active states during VAD=0 will take about 600 ms (60 frames). It is understood that the transition times may differ according to other embodiments. It is noted that this is only an optional implementation of the FSM unit 114. Other implementations are also possible.

Thus, the turbo VAD decision ("VAD" in FIG. 2) provides a per frame indication of whether or not a given stream contains voice. It is noted, however, that giving precedent to one of the conferees based on a per frame determination of which caller is active may result in a poor conference experience. Consequently, the FSM unit 114 smears the per frame decisions to generate decisions based on multiple frames. Downstream of the FSM unit 114, the possible decisions are: (1) stream active (e.g., when a conferee is talking), (2) stream not active (e.g., when a conferee is silent), (3) fade-in (e.g., when a conferee transitions from silence to talking), and fade-out (e.g., when a conferee transitions from talking to silence). After calculating an activity ratio for a given frame, the FSM unit 114 then transmits the calculated activity ratio to the score calculating unit 116 (FIG. 1) to calculate a score, which is a value between 0 and 1, which may be thought of as a final soft VAD decision, and transmits the state information back to the voice monitoring unit 108 as dynamic feedback, to be used by the voice monitoring unit 108 to perform voice and noise power estimations, as explained above.

As a result of this configuration, the voice monitoring unit 108, the turbo VAD unit 110 and the FSM unit 114 form a dynamic feedback closed loop. The FSM unit 114 feeds back the state information to the voice monitoring unit 108, the voice monitoring unit 108 generates a power threshold based on the state information, the turbo VAD unit 110 uses the generated power threshold in the calculation of a turbo VAD decision (specifically, in the comparison between the estimated instantaneous power level and the generated power threshold performed at the comparing unit 138), and the FSM unit 114 uses the turbo VAD decision to determine the state information. Thus, the state information, the generated power threshold, and the turbo VAD decision can all be considered to be types of dynamic feedback.

Figure 3:
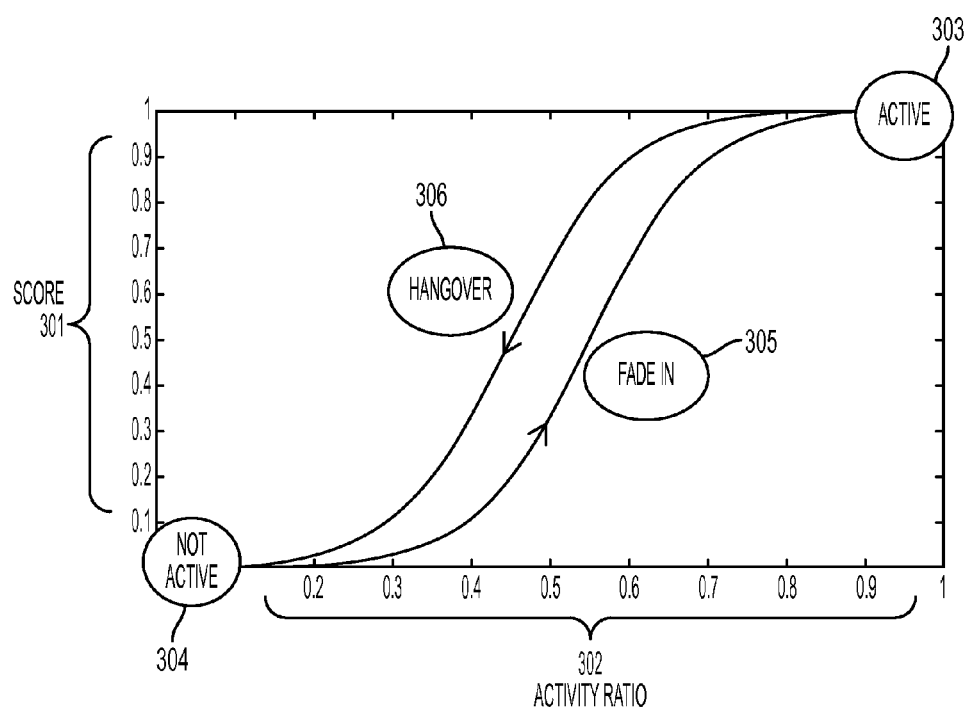
FIG. 3 is a graph illustrating the relationship between score, activity ratio and current state according to an embodiment.

FIG. 3 is a graph illustrating the relationship between score, activity ratio and current state according to an embodiment. As shown in FIG. 3, the score 301 depends on both the activity ratio 302 and the current state (active 303, not active 304, fade in 305, or hangover 306) of a given frame. Thus, the same activity ratio 302 may yield difference scores, depending on the current state of a frame. According to an embodiment, the fade-out (hangover) state 306 will be given priority over the fade-in state 305, so as to give priority to a conferee who has been active in the immediately preceding frames over a conferee who has been inactive in the immediately preceding frames. However, these relationships are merely examples. It is noted that, in an embodiment, priority is configurable and may be assigned in many different ways.

The score calculating unit 116 converts the activity ratios into scores, where the conversion depends on the FSM state. In an embodiment, the score calculating unit 116 calculates each conferee's score using fade in/out functions. The score is a value between 0 and 1.

The score is calculated in an embodiment using the ar (activity ratio) and the current state according to the following Equation 3:

$$\begin{aligned}
&\text{for } (n \neq m) \ \{ \\
&\quad \text{if } (\text{state}(n) == \text{ACTIVE}) \\
&\quad\quad \text{score}(n) = 1 \\
&\quad \text{else if}(\text{state}(n) == \text{NOT ACTIVE}) \\
&\quad\quad \text{score}(n) = 0 \\
&\quad \text{else if}(\text{state}(n) == \text{FADE IN}) \\
&\quad\quad \text{score}(n) = fi(ar) \\
&\quad \text{else if}(\text{state}(n) == \text{FADE OUT}) \\
&\quad\quad \text{score}(n) = fo(ar) \\
&\} \\
&\text{score}(m) = 0
\end{aligned}$$

Equation 3 where $$fi(ar) = \frac{1 + \tanh((ar - 0.5 - \alpha\_fi) \cdot A)}{2}, \quad fo(ar) = \frac{1 + \tanh((ar - 0.5 - \alpha\_fo) \cdot A)}{2}$$

$$\alpha\_fi = 0.05, \ \alpha\_fo = -0.05, \ A = 7$$

In Equation 3, the variable "state(n)" denotes the current FSM state of conferee n, "m" denotes the output port for which the algorithm is applied, and "score(n)" denotes the score which corresponds to conferee n in this algorithm. The masking done by "score(m)=0" is performed so that the output stream on port m will be independent of the input on port m. Two different functions, fi(ar) and fo(ar), are used for fade in/out in order to achieve hysteresis. The score calculating unit 116 then transmits the calculated score to the coefficient calculating unit 120.

It is noted that the score calculating unit 116 is useful when mixing coefficients are proportional to the score. In other embodiments, for example, when coefficients are calculated through speaker selection, it is possible to eliminate the score calculating unit by setting score=ar.

The coefficient calculating unit 120 calculates mixing coefficients based on the score. In an embodiment, the coefficient calculating unit 120 calculates the mixing coefficients according to the following scheme. It is noted that the following scheme is an example only, and that other ways to calculate mixing coefficients may alternatively be used. In the implementation below, speaker selection is used. Speaker selection can also be implemented in many different ways.

First, a weight vector is calculated. Weights are instantaneous coefficients. Final coefficients are generated as time-averages of instantaneous coefficients. This scheme is used in order to avoid abrupt transitions.

Next, up to two active conferees with maximal scores are selected. In case two conferees are selected, each selected conferee is assigned a weight of 0.5. Alternatively, in case one conferee is selected, the selected conferee is assigned a weight of 1. All other conferees are assigned a weight of 0.

Next, the final coefficient is calculated for a given frame. To calculate the final coefficient, the coefficient calculating unit 120 denotes by W(k) the weight vector for frame #k and by C(k) the coefficient vector for the given frame. Equation 4 is used to calculate the final coefficient:

$$C(k) = \sum_{i=0}^{L-1} a_i \cdot W(k-i) \quad \text{Equation 4}$$

Where L=12, $(a_0, \ldots, a_{L-1})$=(0.2864, 0.2175, 0.1155, ..., 0.0333). These values were selected in a way which results in a logarithmic rise/fall of the coefficients. Once the final coefficient is calculated, the coefficient calculating unit transmits the final coefficient to the mixing unit 118.

The mixing unit 118 performs the actual mixing according to Equation 5, in an embodiment:

$$y_j^m = \Sigma c_k^{m,n} x_j^n \quad \text{Equation 5}$$

where $y_j^m$ is sample j on output port m, $x_j^n$ is sample j on input port n after gain control and noise suppression (when enabled). Furthermore, k is the index of the frame that contains sample j and $c_k^{m,n}$ is the mixing coefficient related to input stream n in the calculation of output stream m. Note that $c_k^{m,m}=0$.

The gain control unit 106 uses signal and noise average levels that are generated in the voice monitoring unit 108 to amplify quiet conferees and to attenuate loud conferees. The operation performed by the gain control unit 106 improves upon a conventional automatic gain control (AGC) by using reliable data that is generated with the use of all algorithm components. It is desirable to give different gains for Wide Band (WB) and Narrow Band (NB) inputs in order to compensate for poorer NB quality in an embodiment. After performing gain control operations, the gain control unit 106 outputs the data subjected to the gain control operations to the noise suppression unit 112.

In an embodiment, the noise suppression unit 112 is activated for noisy conferees, achieving high quality noise suppression. It is noted that the use of the noise suppression unit 112 may be expensive in terms of computational resources, and may therefore be modified or omitted in other embodiments. The noise suppression unit 112 performs noise suppression operations on the data and outputs the data subjected to the noise suppression operations to the mixing unit 118.

The output streams are then calculated by the mixing unit 118 using the input streams (which may be modified by the gain control unit 106 and/or the noise suppression unit 112, if activated) and the mixing coefficients.

The output stream transmitting unit 124 transmits the calculated output streams to the conferees.

The comfort noise generating unit 122 generates voice activity flag and noise level (collectively referred to as comfort noise generating information) for the use of a CNG (Comfort Noise Generator) at the receivers of the conferees. CNG provides attenuated or otherwise synthesized background noise, in an embodiment, and is used to avoid total silence so as to recreate a suitable simulated background and provide an audible continuity during periods of voice inactivity. The voice activity flag corresponds to the FSM state. If the state of all the relevant conferees is NOT ACTIVE voice activity flag is set to 0 (unvoiced), and in any other case the flag is set to 1 (voice). The noise level is taken directly from the voice monitoring unit 108. The comfort noise transmitting unit 126 transmits the generated comfort noise generating information to the receivers of the conferees, and the receivers generate comfort noise based on the received comfort noise generating information.

It is noted that, depending on the selected architectural arrangement, each of the logical blocks shown in FIG. 1 is operative in response to the inputs that it receives, or is controlled by a control block (not seen).

Figure 4:
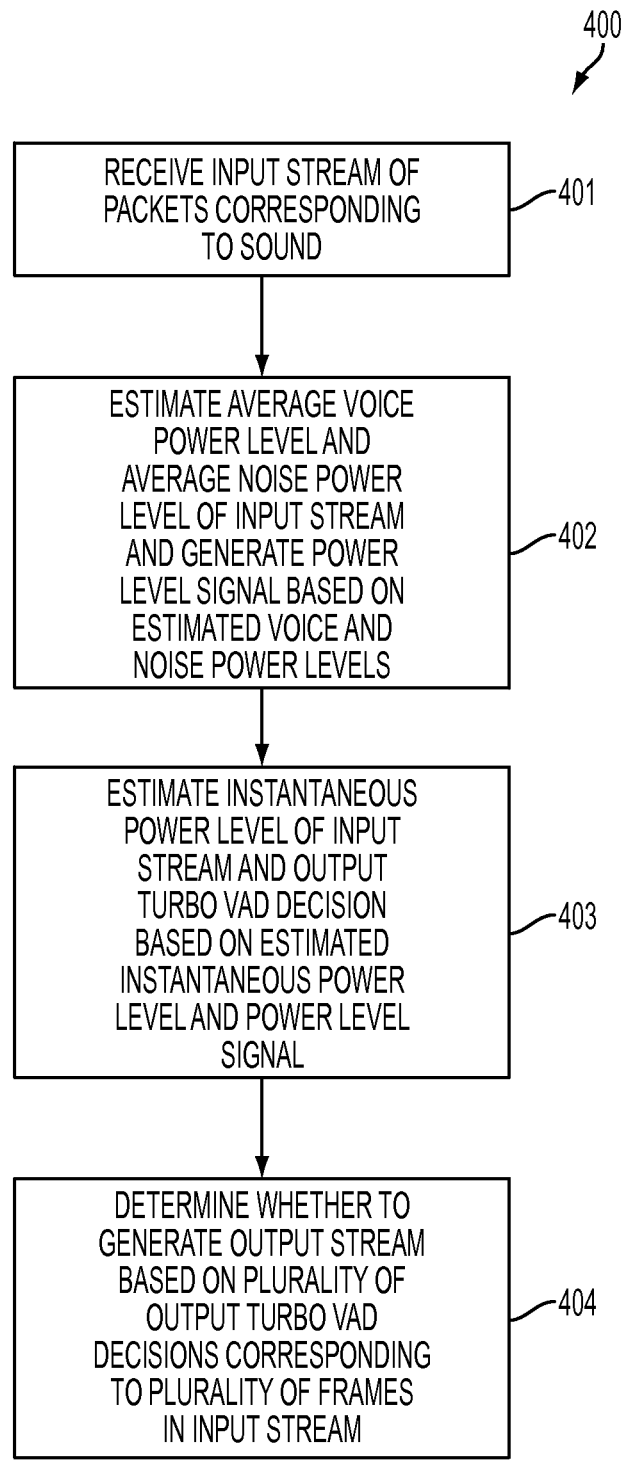
FIG. 4 is a flow diagram illustrating a conference mixing method according to an embodiment.

FIG. 4 is a flow diagram illustrating a conference mixing method according to an embodiment. The description of the conference mixing method 400 shown in FIG. 4 assumes, merely as an example, that the method is performed by the conference mixer 102 shown in FIG. 1 and described above. However, it is understood that the conference mixing method 400 may be performed by numerous other types of suitable conference mixers.

In operation 401, an input stream of packets corresponding to sound is received. For example, the input stream receiving unit 104 receives an input stream of packets corresponding to sound.

In operation 402, an average voice power level and an average noise power level of the input stream is estimated, and a power threshold based on the estimated voice and noise power levels is generated. For example, the voice power estimating unit 128 estimates the average voice power level, the noise power estimating unit 130 estimates the average noise power level, and the threshold generating unit 132 generates a power threshold based on the estimated average voice and noise levels.

In operation 403, an instantaneous power level of an input stream is estimated and a turbo VAD decision based on the estimated instantaneous power level and the power threshold is output. For example, the instantaneous power estimating unit 134 estimates the instantaneous power level of an input stream, and the turbo VAD unit 110 outputs a turbo VAD decision based on a comparison between the estimated instantaneous power level and the power threshold at the comparing unit 138. It is further noted that the turbo VAD decision can also be based on other criteria as well, including, for example, a spectral VAD decision output from the spectral VAD unit 136.

In operation 404, a determination is made as to whether to generate an output stream based on a plurality of output turbo VAD decisions corresponding to a plurality of frames in the input stream. For example, the conference mixer 102 decides whether to generate an output stream based on a plurality of turbo VAD decisions output from the turbo VAD unit 110 and processed by the finite state machine 114 and other components (e.g., score calculating unit 116, coefficient calculating unit 120, mixing unit 118, etc), as described above with respect to FIG. 1.

Figure 5:
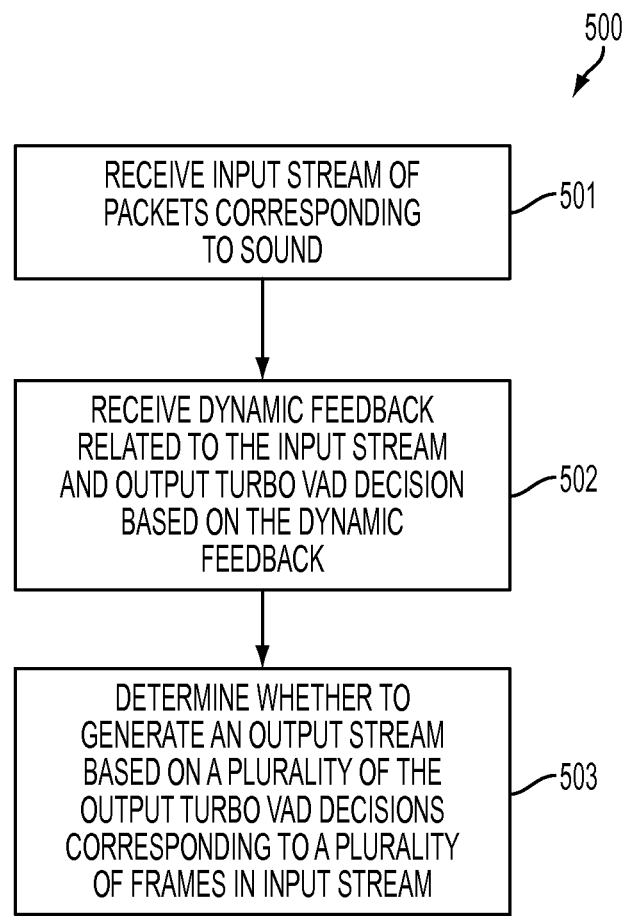
FIG. 5 is a flow diagram illustrating a conference mixing method according to another embodiment.

FIG. 5 is a flow diagram illustrating a conference mixing method according to another embodiment. Like FIG. 4, the description of the conference mixing method 500 shown in FIG. 5 assumes, merely as an example, that the method is performed by the conference mixer 102 shown in FIG. 1 and described above. However, it is noted that the conference mixing method 500 may be performed by numerous other types of suitable conference mixers.

In operation 501, an input stream of packets corresponding to sound is received. For example, the input stream receiving unit 104 receives an input stream of packets corresponding to sound.

In operation 502, dynamic feedback related to the input stream is received and a turbo VAD decision based on the dynamic feedback is output. For example, the dynamic feedback can be the power threshold generated by the threshold generating unit 132, the comparing unit 138 can receive the power threshold, and the turbo VAD decision can be output based on the received power threshold. Alternatively, the dynamic feedback can be the state information output from the FSM unit 114. It is further noted that the turbo VAD decision can also be based on other criteria as well, including, for example, a spectral VAD decision output from the spectral VAD unit 136.

In operation 503, a determination is made as to whether to generate an output stream based on a plurality of output turbo VAD decisions corresponding to a plurality of frames in the input stream. For example, the conference mixer 102 decides whether to generate an output stream based on a plurality of turbo VAD decisions output from the turbo VAD unit 110 and processed by the finite state machine 114 and other components (e.g., score calculating unit 116, coefficient calculating unit 120, mixing unit 118, etc), as described above with respect to FIG. 1.

Figure 6:
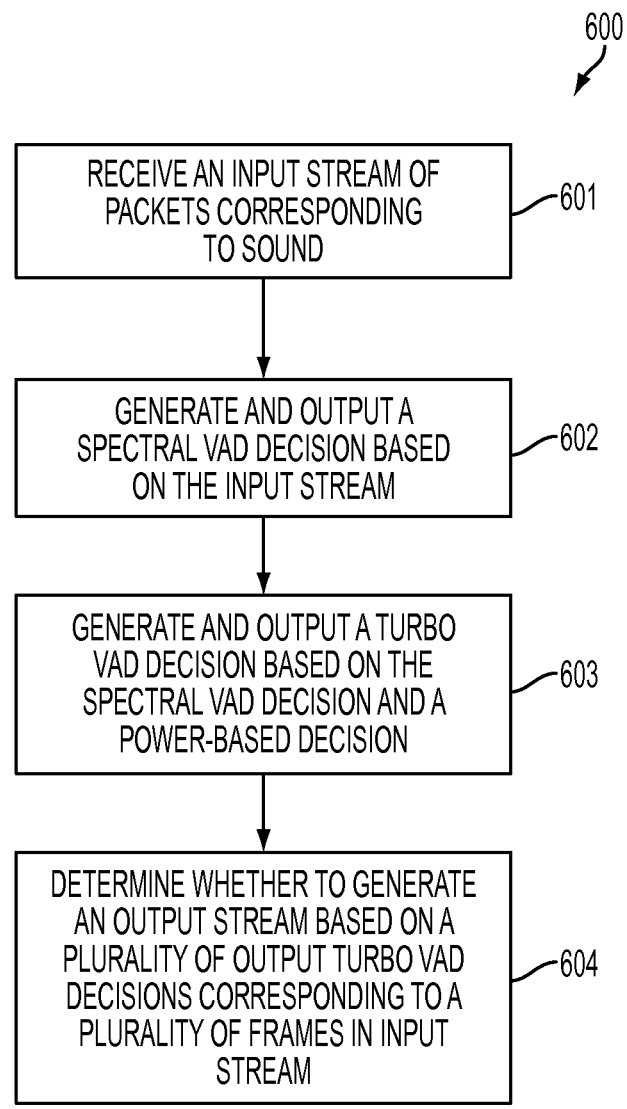
FIG. 6 is a flow diagram illustrating a conference mixing method according to yet another embodiment.

FIG. 6 is a flow diagram illustrating a conference mixing method according to yet another embodiment. Like FIG. 4, the description of the conference mixing method 600 shown in FIG. 6 assumes, merely as an example, that the method is performed by the conference mixer 102 shown in FIG. 1 and described above. However, it is noted that the conference mixing method 600 may be performed by numerous other types of suitable conference mixers.

In operation 601, an input stream of packets corresponding to sound is received. For example, the input stream receiving unit 104 a plurality of input streams of data packets from a corresponding plurality of conferees.

In operation 602, a spectral VAD decision based on the input stream is generated and output. For example, the spectral VAD unit 136 generates and outputs a spectral VAD decision indicating whether a frame of data packets is voice for each of the input streams.

In operation 603, a turbo VAD decision based on the spectral VAD decision and a power-based decision is generated and output. For example, the turbo VAD unit 110 generates and outputs a turbo VAD decision that indicates for a frame of data packets which of the input streams is active. More specifically, the turbo VAD unit 110 generates and outputs the turbo VAD decision based on the spectral VAD decisions for each of the input streams and a power-based decision indicating whether an estimated instantaneous power level of a frame is greater than a power threshold for each of the input streams.

In operation 604, a determination is made as to whether to generate an output stream based on a plurality of output turbo VAD decisions corresponding to a plurality of frames in the input stream. For example, the conference mixer 102 selects which of the input streams to output as an active stream based on a plurality of the turbo VAD decisions corresponding to a plurality of frames in the input streams. The conference mixer 102 makes the selection based on a plurality of turbo VAD decisions output from the turbo VAD unit 110 and processed by the finite state machine 114 and other components (e.g., score calculating unit 116, coefficient calculating unit 120, mixing unit 118, etc), as described above with respect to FIG. 1.

Although the inventive concept has been described above with respect to the various embodiments, is noted that there can be a variety of permutations and modifications of the described illustrative features by those who are familiar with this field, without departing from the technical ideas and scope of the features, which shall be defined by the appended claims.

A number of examples have been described above. Nevertheless, it is noted that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A conference mixer, comprising:
   an input stream receiving unit configured to receive a plurality of input streams of data packets from a corresponding plurality of conferees connected to the conference mixer;
   a spectral voice activity detection (VAD) unit configured to, for each of the input streams, generate and output a spectral VAD decision indicating whether a frame comprising data packets is voice;
   a turbo VAD unit configured to generate and output a turbo VAD decision that indicates for a frame comprising data packets which of the input streams is active, the turbo VAD decision being based on the spectral VAD decisions for each of the input streams and a power-based decision indicating whether an estimated instantaneous power level of a frame comprising data packets is greater than a power threshold for each of the input streams; and
   a finite state machine (FSM) unit configured to select which of the input streams to output as an active stream based on a plurality of the turbo VAD decisions corresponding to a plurality of frames in the input streams.

2. The conference mixer according to claim 1, wherein the turbo VAD unit comprises:
   a power estimating unit configured to estimate, for each of the input streams, the instantaneous power level of a frame;
   a comparing unit configured to compare, for each of the input streams, the estimated instantaneous power level of the frame with the power threshold, the power threshold indicating a minimum power level of voice data, and to output the power-based decision based on a result of the comparison;
   the spectral VAD unit configured to output, for each of the input streams, the spectral VAD decision; and
   a multiplier configured to multiply, for each of the input streams, the power-based decision and the spectral VAD decision to generate the turbo VAD decision.

3. The conference mixer according to claim 1, wherein the spectral VAD unit is disposed within the turbo VAD unit.

4. The conference mixer according to claim 1, wherein the spectral VAD unit comprises a VAD unit implemented in accordance with ITU-T G.729 annex B recommendation.

5. The conference mixer according to claim 1, further comprising:
a voice monitoring unit configured to, for each of the input streams, estimate an average voice power level and an average noise power level of the input stream and to generate the power threshold based on a weighted average of the estimated average voice power level and the estimated average noise power level.

6. The conference mixer according to claim 5, wherein the FSM unit is configured to generate, for each of the input streams, an activity ratio indicative of a likelihood that the input stream is voice data based on the turbo VAD decision.

7. The conference mixer according to claim 6, wherein the FSM unit generates the activity ratio such that the generated activity ratio comprises a numerical value between 0 and 1, wherein the value "0" indicates a complete absence of voice data in the input stream, and wherein the value approaches the value "1" as an amount of the voice data in the input stream increases.

8. The conference mixer according to claim 7, wherein:
the FSM unit is further configured to generate, for each of the input streams, state information indicating a current state of the input stream, the current state indicative of whether the input stream is currently carrying voice data, and feedback the state information to the voice monitoring unit, and
the voice monitoring unit is further configured to estimate the average voice power level and the average noise power level of the input stream based on the state information fedback from the FSM unit.

9. The conference mixer according to claim 8, wherein the FSM unit generates the state information to indicate one of the following current states of the input stream: (a) an active state indicating that the input stream is currently carrying voice data, (b) a not active state indicating that the input stream is currently not carrying any voice data, (c) a fade-in state indicating that the input stream is transitioning from the not active state to the active state, and (d) a fade-out state indicating that the input stream is transitioning from the active state to the not active state.

10. The conference mixer according to claim 5, further comprising a gain control unit configured to, for each of the input streams, adjust a gain based on the estimated average voice power level of the input stream and the estimated average noise power level of the input stream.

11. The conference mixer according to claim 5, further comprising a noise suppressor configured to, for each of the input streams, suppress noise based on the estimated average voice power level of the input stream and the estimated average noise power level of the input stream.

12. A method of conference mixing, comprising:
receiving a plurality of input streams of data packets from a corresponding plurality of conferees;
generating and outputting a spectral VAD decision indicating whether a frame comprising data packets is voice for each of the input streams;
generating and outputting a turbo VAD decision that indicates for a frame comprising data which of the input streams is active, the generating and outputting of the turbo VAD decision being based on the spectral VAD decisions for each of the input streams and a power-based decision indicating whether an estimated instantaneous power level of a frame is greater than a power threshold for each of the input streams; and
selecting which of the input streams to output as an active stream based on a plurality of the turbo VAD decisions corresponding to a plurality of frames in the input streams.

13. The method according to claim 12, further comprising:
estimating, for each of the input streams, the instantaneous power level of a frame;
comparing, for each of the input streams, the estimated instantaneous power level of the frame with the power threshold, the power threshold indicating a minimum power level of voice data, and outputting the power-based decision based on a result of the comparing;
outputting, for each of the input streams, the spectral VAD decision; and
multiplying, for each of the input streams, the power-based decision and the spectral VAD decision to generate the turbo VAD decision.

14. The method according to claim 12, wherein the generating and outputting of the spectral VAD decision comprises generating and outputting the spectral VAD decision using a spectral VAD unit disposed within a turbo VAD unit used to generate the turbo VAD decision.

15. The method according to claim 12, wherein the generating and outputting of the spectral VAD decision comprises using a VAD unit implemented in accordance with ITU-T G.729 annex B recommendation to generate and output the spectral VAD decision.

16. The method according to claim 12, further comprising:
for each of the input streams, estimating an average voice power level and an average noise power level of the input stream and generating the power threshold based on a weighted average of the estimated average voice power level and the estimated average noise power level.

17. The method according to claim 16, further comprising, for each of the input streams, generating an activity ratio indicative of a likelihood that the input stream is voice data based on the turbo VAD decision.

18. The method according to claim 17, wherein the generating of the activity ratio comprises generating the activity ratio such that the generated activity ratio comprises a numerical value between 0 and 1, wherein the value "0" indicates a complete absence of voice data in the input stream, and wherein the value approaches the value "1" as an amount of the voice data in the input stream increases.

19. The method according to claim 18, further comprising:
generating, for each of the input streams, state information indicating a current state of the input stream, the current state indicative of whether the input stream is currently carrying voice data, and feeding back the state information, and
estimating the average voice power level and the average noise power level of the input stream based on the state information feedback.

20. The method according to claim 19, wherein the generating of the state information comprises generating the state information to indicate one of the following current states of the input stream: (a) an active state indicating that the input stream is currently carrying voice data, (b) a not active state indicating that the input stream is currently not carrying any voice data, (c) a fade-in state indicating that the input stream is transitioning from the not active state to the active state, and (d) a fade-out state indicating that the input stream is transitioning from the active state to the not active state.

* * * * *